United States Patent
Murata et al.

(10) Patent No.: US 7,192,265 B2
(45) Date of Patent: Mar. 20, 2007

(54) IN-MOLD FOAM MOLDING EQUIPMENT AND MOLDING METHOD

(75) Inventors: Seishiro Murata, Kanuma (JP); Satoru Shioya, Kanuma (JP); Masayuki Fukuda, Kanuma (JP)

(73) Assignee: JSP Corporation, Tokyo (JP)

( * ) Notice: Subject to any disclaimer, the term of this patent is extended or adjusted under 35 U.S.C. 154(b) by 281 days.

(21) Appl. No.: 10/848,052

(22) Filed: May 19, 2004

(65) Prior Publication Data
US 2004/0234636 A1 Nov. 25, 2004

(30) Foreign Application Priority Data
May 20, 2003 (JP) ............... 2003-141509

(51) Int. Cl.
*B29C 44/58* (2006.01)
(52) U.S. Cl. ............ 425/4 R; 249/129; 249/131; 425/817 R
(58) Field of Classification Search ............ 425/4 R, 425/817 R; 249/129, 131
See application file for complete search history.

(56) References Cited

U.S. PATENT DOCUMENTS

| 4,608,213 A | 8/1986 | Kurumizawa et al. |
| 5,252,270 A | 10/1993 | Haardt et al. |
| 6,619,943 B1 | 9/2003 | Sameshima et al. |

FOREIGN PATENT DOCUMENTS

| DE | 100 48 399 A1 | 5/2001 |
| JP | 61-114839 | 6/1986 |
| JP | 63-242521 | 10/1988 |
| JP | 2000-16205 | 1/2000 |
| JP | 2001-63496 | 3/2001 |
| JP | 2002-234044 | 8/2002 |
| WO | WO 03/078127 | 9/2003 |

*Primary Examiner*—Allan R. Kuhns
(74) *Attorney, Agent, or Firm*—Oblon, Spivak, McClelland, Maier & Neustadt, P.C.

(57) ABSTRACT

An in-mold foam molding equipment, includes at least a movable partition member for dividing a molding space formed by a pair of molds into divided spaces,
wherein the partition member is composed of a plurality of divisional partition members,
wherein each of the divisional partition members individually has a retreat positioning protrusion and a insert positioning protrusion, and the divisional partition members are installed in a slider, wherein the slider is configured to move between the retreat positioning protrusions and the insert positioning protrusions, and the divisional partition members are configured to be movable in cooperation with the motion of the slider moving by contacting with the retreat positioning protrusions or the insert positioning protrusions, so that the divisional partition members divide the molding space into divided spaces, and therefore an integral molded article suppressed in occurrence of large protrusions and deep holes can be manufactured.

10 Claims, 8 Drawing Sheets

2 divisional partition member
3 slider
4 insert positioning protrusion
5 retreat positioning protrusion
11 core mold
12 cavity mold
14 filling device
15 housing
60 leading end (1)

(2)

(3)

IN-MOLD FOAM MOLDING EQUIPMENT AND MOLDING METHOD

CROSS-REFERENCES TO RELATED APPLICATIONS

The present application claims priority under 35 U.S.C.§119 to Japanese Application No. 2003-141509, filed May 20, 2003, entitled "IN-MOLD FOAM MOLDING EQUIPMENT AND MOLDING METHOD". The contents of this application are incorporated herein by reference in their entirety.

BACKGROUND OF THE INVENTION

1. Field of the Invention

The present invention relates to an in-mold foam molding equipment (hereinafter called in-mold molding equipment) for manufacturing one molded article, or a molded article having two or more molded portions different in characteristics, and more particularly to an in-mold molding equipment capable of suppressing occurrence of holes and defects as cause of drop of strength and also suppressing occurrence of large protrusions in the boundary of molded portions having different characteristics in one molded article or its periphery, and an in-mold molding method using such equipment.

2. Description of the Related Art

Hitherto, as a method of increasing the strength and reducing the weight partially in a molded article, it has been attempted to divide one molded article into plural portions, and the individual pieces are molded, and then integrated into one molded article. In this method, using two or more pair of metal molds corresponding to the shape of each portion, each metal molding space is filled with foamed beads corresponding to the required characteristics of each portion, and partial molded articles are formed. The individual molded articles are mutually adhered, and one molded article is formed. In this method, metal molds must be manufactured for individual portions, and as the number of divisions increases, the entire manufacturing process is complicated and the efficiency is extremely poor.

By contrast, an in-mold molding equipment is proposed, in which a pair of metal molds is divided into plural molding spaces by using a partition member, and each space is filled with different foamed beads, without being mixed, and an article is integrally molded in a pair of metal molds. In this in-mold molding equipment, the partition member is provided in a molding space by way of an actuator such as air cylinder through a cavity mold or a core mold, and this partition member divides the molding space into plural molding spaces. Each space is connected to at least one filling device for supplying individual foamed beads. That is, in the molding spaces divided by the partition member, plural foamed beads different in characteristics are supplied into individual spaces. After filling with beads, the partition member is drawn back. In the midst of withdrawing or after withdrawing, steam is supplied into mutually adjacent molding spaces, and foamed beads are heated and melted, and a molded article is obtained (for example, see patent document 1).

Moreover, in-mold foam molding equipment is proposed, in which a partition member of comb tooth structure arranged in narrow intervals not allowing to pass foamed beads is fixed and disposed at least to one of cavity mold or core mold to divide the molding space into plural sections, and foamed beads are supplied into divided spaces, and heated and melted, so that an integrated foamed molded article is manufactured (for example, see patent document 2).

In addition, in-mold foam molding equipment is proposed, in which a partition member having comb tooth structure with narrow intervals not allowing to pass foamed beads to be filled is disposed in a molding space, at the leading end of a movable partition board for dividing the molding space into plural molding spaces (for example, see patent document 3).

[Patent Document 1]
JP 1999-334501 Unexamined Patent Publication (Kokai)

[Patent Document 2]
JP 2001-150471 Unexamined Patent Publication (Kokai)

[Patent Document 3]
JP 2002-172642 Unexamined Patent Publication (Kokai)

According to these methods, suppressing the number of molding processes for molded article, foamed beads can be changed depending on the positions of the molded article, and an integral molded article different in mechanical properties and visual features depending on the position of the molded article can be manufactured. Therefore, such methods are effective to enhance the quality and properties of molded article easily and outstandingly, and are widely employed in core materials for automobile bumpers, or cushion materials for packaging household electric products and furniture.

In the method by the molding equipment disclosed in patent document 1, since the partition member is a plate structure, depending on the shape of the cavity mold, large protrusions are consequently formed by molding after drawing back the partition member inserted in the molding space through the core mold, and it is attempted to suppress occurrence of large protrusions by using a pair of metal molds having the inner peripheral walls of the cavity mold positioned above and below the partition member projecting into the molding space. However, in the obtained molded article, large groove defects are formed around the location of the partition member when filling with foamed beads, and the strength of the molded article is lowered.

In the method by the molding equipment disclosed in patent document 2, since the partition member is lying across the molding space in the expanding and molding process, deep holes corresponding to the comb tooth partition member are formed in the molded article, and the strength of the molded article is lowered. In the method by the molding equipment disclosed in patent document 3, the comb tooth member is installed in the molding space in the molding process, as a result, multiple deep holes corresponding to the comb tooth member are formed in the molded article at positions corresponding to the location of the comb tooth member.

When the molded article is manufactured for the purpose of energy absorbing material, such defects and holes are serious problems. The energy absorbing material is supposed to absorb the impact when a strong impact is applied from outside. In the molded article having peripheral defects or multiple deep holes, when impact is applied, destruction of molded article is likely to occur with a central focus on these peripheral defects and multiple deep holes, and the strength is lowered as compared with the molded articles free from such peripheral defects or multiple deep holes. In particular, in a small molded article or thin molded article, effects of such strength reduction are significant.

SUMMARY OF THE INVENTION

An object of the present invention is to provide an in-mold foaming equipment capable of manufacturing an integral molded article having molded portions different in characteristics while minimizing occurrence of large defects or multiple deep holes in the peripheral area of the partition member in the molded article, and suppressing occurrence of large protrusions, and a manufacturing method of such integral molded article.

A first aspect of the present invention relates to an in-mold foam molding equipment having at least a movable partition member free to move in and out for dividing a molding space formed by a pair of molds into divided spaces. The partition member is composed of a plurality of divisional partition members independently divided into divided spaces. Each of the divisional partition members individually has a retreat positioning protrusion and a insert positioning protrusion. The divisional partition members are installed in a slider for moving the divisional partition members by contacting with the retreat positioning protrusions or the insert positioning protrusions. The slider is configured to move between the retreat positioning protrusions and the insert positioning protrusions, and the divisional partition members are configured to be movable in cooperation with the motion of the slider moving by contacting with the retreat positioning protrusions or the insert positioning protrusions, so that the divisional partition members divide the molding space corresponding to the shape of a desired molded article into divided spaces.

It is preferable that the retreat positioning protrusion is installed at a position where the leading end of the divisional partition member is present within a specific range from the inside molding surface of one mold in the state of the divisional partition member drawn back from the inside molding surface of other mold, and the insert positioning protrusion is installed at a position where the position of the leading end of the divisional partition member contacts with the inside molding surface of the other mold or is present with a specific range from the inside molding surface of the other mold in the state of the divisional partition member inserted into the molding space.

It is preferable that the slider for moving the divisional partition member by contact with the retreat positioning protrusion or the insert positioning protrusion in the divisional partition member is provided inside of housing of the in-mold foam molding equipment, and a drive device for operating the slider is also provided.

It is preferable that a pair of molds is composed of a core mold and a cavity mold, and the divisional partition members are installed in the slider enable to be inserted into the molding space from the core mold side.

A second aspect of the present invention relates to an in-mold foam molding method for manufacturing a molded article having two or more molded portions with different characteristics, by using an in-mold foam molding equipment of the first aspect, the method, comprises dividing the molding space formed by the pair of molds into the divided spaces with the partition member composed of the divisional partition members, filing the divided spaces respectively with specified foamed beads, drawing back the partition member after filling, and feeding steam to heat, melt and integrate the foamed beads.

Figure 1:
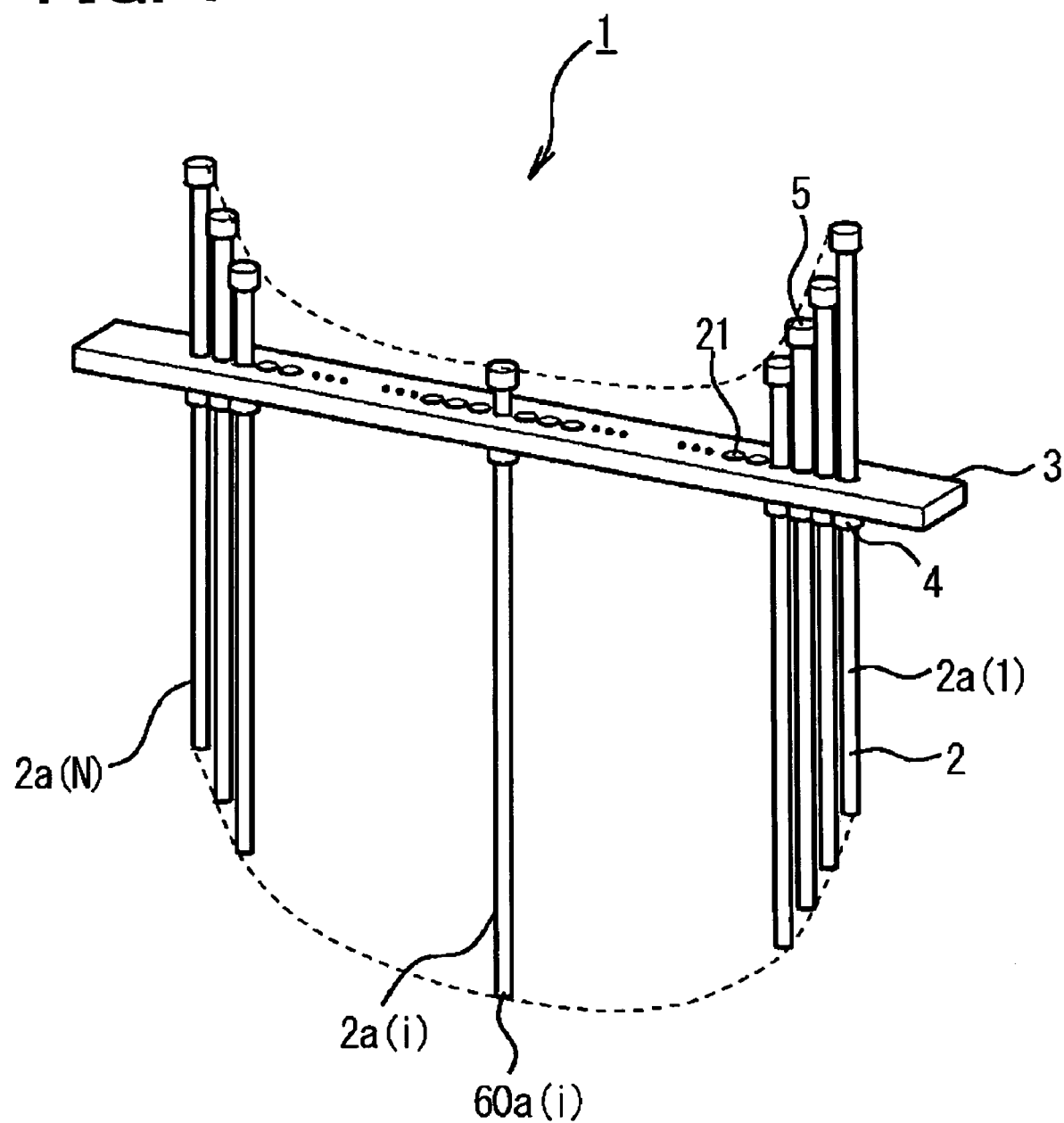
FIG. 1 is a perspective view showing an example of divisional partition members of the present invention.

DESCRIPTION OF REFERENCE NUMERALS 1, 1A, 1B, 1C Partition member
2, 2a (i) (i being a positive integer) Divisional partition member
3 Slider
4 Insert positioning protrusion
5 Retreat positioning protrusion
8 Plate
10 In-mold molding equipment
11 Core mold
12 Cavity mold
13 Molding space
13a, 13b, 13c, 13d Divided molding space
14 Filling device
15 Housing
16a, 16b Chamber
17 Ventilation hole
18 Feed port
19 Discharge port
20, 21, 23 Insertion hole
31 Retreating direction B
32 Inserting direction A
40a, 40b, 40c, 40d, 40e Partition member layout
50 Air cylinder
51 Mold thickness
52, 52a, 52b, 52c Moving distance adjusting means
53a, 53b, 53c Connection member
56 Metal mold inner surface
60, 60a (i) Leading end
61 Metal mold outer surface
62 Protrusion allowable length
110 Side impact energy absorber 111 Central impact energy absorber
112 Middle impact energy absorber
114 Bumper core material
115 Boundary

DESCRIPTION OF THE PREFERRED EMBODIMENTS

An in-mold molding equipment of the present invention has a molding space formed by a pair of molds such as core mold and cavity mold, a pair of molds such as cavity mold and a flat plate mold capable of closing it, a pair of molds such as cavity mold and other cavity mold capable of closing it, or other pair of molds, and this molding space is divided into a plurality of sections by a partition member, which has plural movable divisional partition members, and each divisional partition members of the partition member has retreat positioning protrusions and insert positioning protrusions for defining the retreat and insert positions corresponding to the shape of the molding surface of the mold, and a slider is provided between the retreat positioning protrusions and insert positioning protrusions in order to operate the divisional partition members, and the divisional partition members are slidably mounted on the slider, and the divisional partition members are moved in cooperation with the motion of the slider. In this case, when the pair of molds is composed of a pair of metal molds consisting of core mold and cavity mold, it is preferable because the durability of molds and deformation preventive effect of molds are excellent. In addition, as a mold other than metal, the mold consists of synthetic resin with high heat resistance or the mold consists of ceramics is exemplified.

The in-mold foam molding equipment of the present invention is described below while referring to the accompanying drawings.

FIG. 1 is a partially cut-away perspective view showing an embodiment of an essential part of a partition member 1 composed of divisional partition members 2 of the present invention. The partition member 1 comprises divisional partition members 2, a slider 3, insert positioning protrusions 4, and retreat positioning protrusions 5. The slider 3 is disposed between the insert positioning protrusions 4 and retreat positioning protrusions 5, and divisional partition members 2 (2a (1), . . . , 2a (i), . . . , 2a (N) ) are disposed so as to be slidable in insertion holes 21 formed in the slider 3 or movable in the insertion holes 21. In this case, N is the number of divisional partition members 2 disposed in the partition member 1, and i is a positive integer of 1 or more and N or less. Unless otherwise specified hereinafter, N and i are defined same as above.

Figure 2:
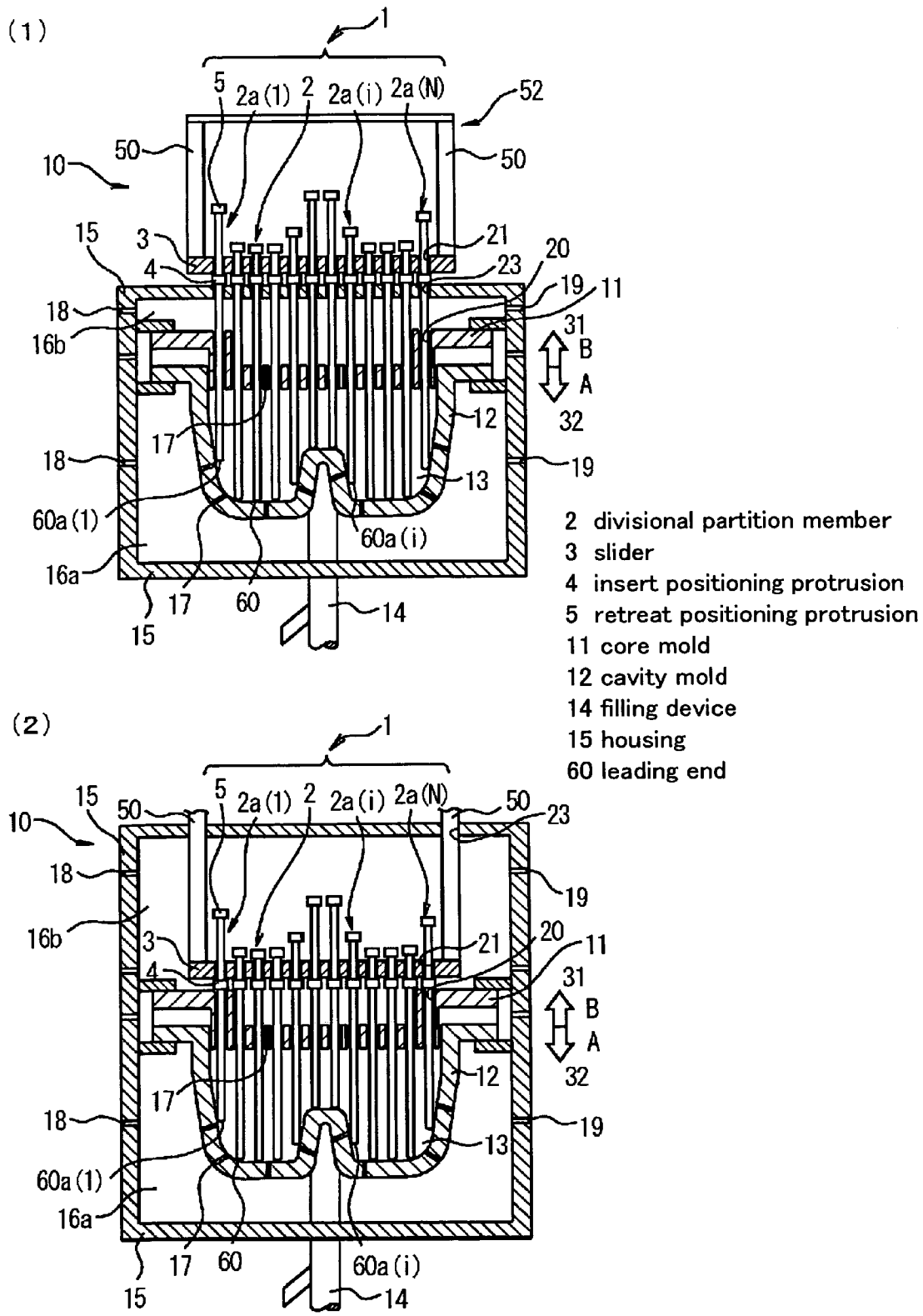
FIG. 2 (1) is a sectional view in the horizontal direction of an embodiment of in-mold molding equipment having divisional partition members of the present invention, and FIG. 2 (2) is a sectional view in the horizontal direction of other embodiment of in-mold molding equipment having divisional partition members of the present invention.

FIG. 2 (1) is a horizontal sectional view of one embodiment of in-mold molding equipment having a partition member 1 composed of divisional partition members 2 of the present invention. In this in-mold molding equipment 10, the molding surface of a core mold 11 and the molding surface of a cavity mold 12 are disposed face to face, and a molding space 13 is formed, and at least one filling device 14 for filling foamed beads in the molding space 13 is provided.

A housing 15 has a frame shape plate and a rear plate. The core mold 11 and cavity mold 12 are installed at specified positions in the housing 15. At the back side of the core mold 11 and cavity mold 12, a set of chamber 16a and chamber 16b is formed. The chamber 16a and chamber 16b, and the molding space 13 communicate with each other by way of ventilation holes 17 provided in the core mold 11 and cavity mold 12. Each of the ventilation holes 17 is opening of about 0.05 to 0.8 mm in diameter, or a core vent having a plurality of openings of about 0.05 to 0.8 mm in diameter may be installed as each of the ventilation holes.

The chamber 16a and chamber 16b have a feed port 18 and a discharge port 19. The feed port 18 and discharge port 19 are connected to pipings not shown, and steam or cooling water or specified fluid can be supplied and discharged, and the pipings are provided with valves so that the structure is kept airtight.

Figure 6:
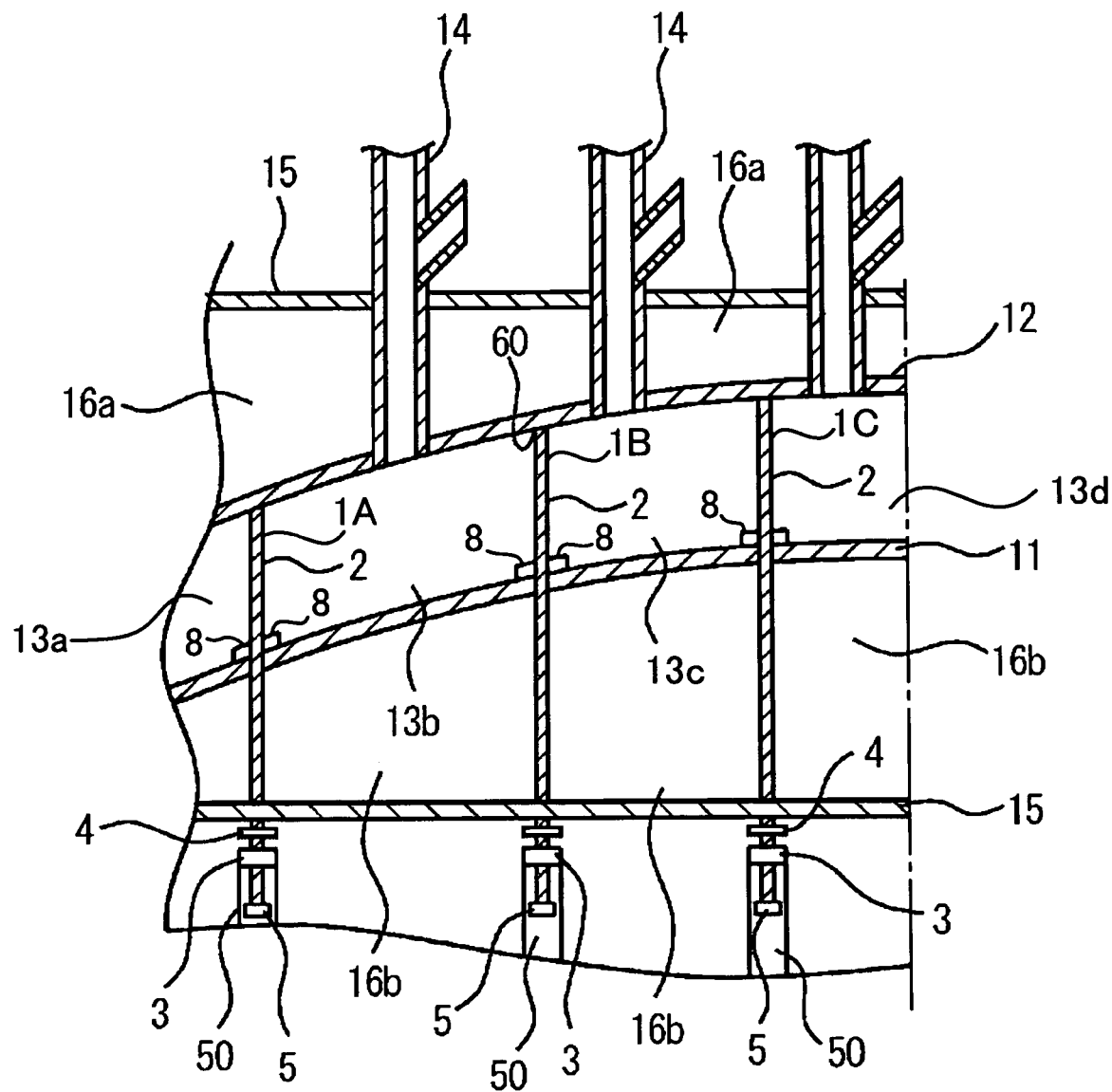
FIG. 6 is a partial diagrammatic view of section in the vertical direction of molding equipment, showing a divided state of molding space by the partition member of the present invention.

The molding space 13 can be divided into divided molding space 13a and divided molding space 13b as shown in FIG. 6, by way of the partition member 1A composed of divisional partition members 2. The divided molding space 13a and divided molding space 13b are individually connected to the filling device 14.

Therefore, the mutually adjacent divided molding space 13a and divided molding space 13b have a structure so as to be filled with foamed beads of mutually different characteristics as specified by means of the divisional partition members 2, without being mixed by more than specified amount or without being mixed at all.

The shape of the divided molding spaces, the number of divided molding spaces, and divided positions may be set freely depending on the molded article to be manufactured.

In addition, FIG. 6 is one of the example of partially sectional view which shows the molding equipment having plural number of the partition members 1A, 1B and 1C in the present invention. In this example, each partition members 1A, 1B and 1C is composed of the divisional partition members 2. This molding equipment has plural number of the partition members 1A, 1B and 1C, and thus, plural number of the divided molding spaces 13a, 13b, 13c and 13d can be formed.

The housing 15 has insertion holes 23 for installing the divisional partition members 2 composing the partition member 1. The core mold 11 also has insertion holes 20 for installing the divisional partition members 2 of the partition member 1, and the divisional partition members 2 are slidably installed in the insertion holes 20 and 23. Usually, when the insertion holes 23 are provided in the housing 15, the insertion holes 23 are designed to keep airtight.

Outside of the housing 15, the slider 3 is disposed for moving the divisional partition members 2 composing the partition member 1, and the slider 3 has insertion holes 21 corresponding to the shape of the divisional partition members in FIG. 2 (1). The divisional partition members 2 are designed to slide by way of insertion holes 21 of the slider 3, insertion holes 23 of the housing 15, and insertion holes 20 of the core mold 11, or move in the insertion holes 21, insertion holes 23, and insertion holes 20, and move in and out for the molding space 13 of the in-mold molding equipment as shown below by the operation of the slider 3.

That is, when the slider 3 moves in the direction of inserting direction A (direction of arrow 32 in FIG. 2 (1)) of the divisional partition members 2, the divisional partition members 2 move in the molding space 13 to the inside molding surface of the cavity mold 12. When the leading ends 60 of the divisional partition members 2 reach the specified position on the molding surface of the cavity mold 12, usually, the insert positioning protrusions 4 provided in the divisional partition members 2 contact with the outer surface of the slider 3, and insertion of the divisional partition members 2 is complete, and the molding space 13 is divided into specified divided molding space 13a and divided molding space 13b.

In the complete state of insertion of divisional partition members 2, the insert positioning protrusions 4 may be at positions reaching up to the outer surface of the housing 15, or at position not reaching. This is because the divisional partition members 2 of the partition member 1 have a structure capable of controlling the insert distance to this molding space depending on the setting position of the insert positioning protrusions 4.

The leading ends 60 of the divisional partition members 2 may contact by point, by line or by plane at specified positions on the molding surface of the cavity mold 12. Meanwhile, the leading ends 60 of the divisional partition members 2 are not always required to be in contact with the molding surface of the cavity mold 12 at the specified positions of the molding surface of the cavity mold 12 as far as the foamed beads do not move between adjacent the divided molding space 13a and divided molding space 13b through the gap between the molding surface of the cavity mold 12 and the leading ends 60.

Figure 3:
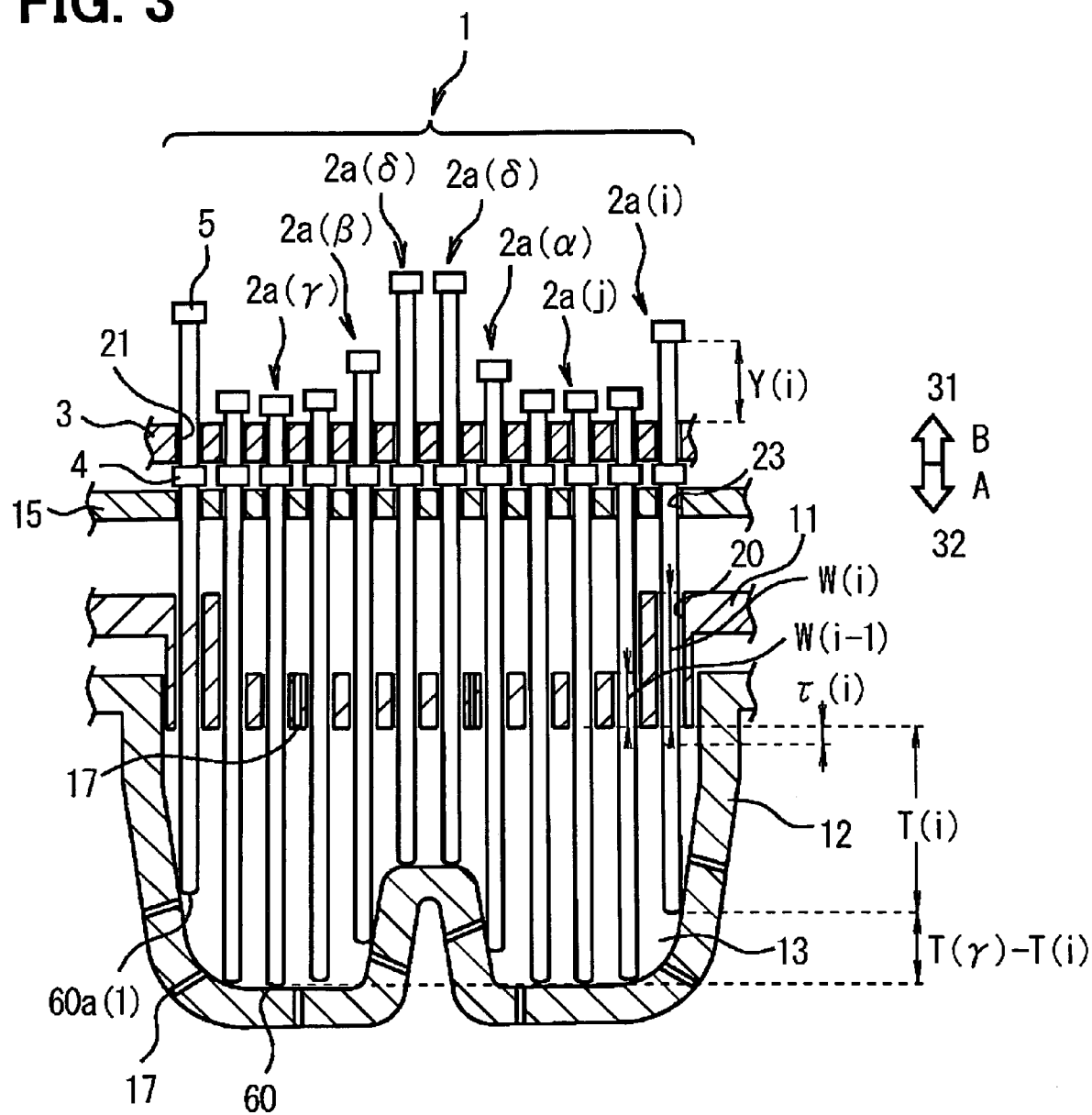
FIG. 3 is a drawing (partial diagrammatic view) explaining working state of each divisional partition member for composing a partition member of in-mold molding equipment of the present invention.

FIG. 3 is a partial diagrammatic view explaining working state of each divisional partition member for composing the partition member 1, showing the setting positions of the insert positioning protrusions 4 and retreat positioning protrusions 5.

Considering from the structure of the partition member 1, the insert distance of the divisional partition member 2a (i) depends on the setting position of the insert positioning protrusion 4, and the setting position of the insert positioning protrusion 4 is provided depending on the shape of the molding surface of the cavity mold. That is, the insert distance of the divisional partition member 2a (i) when filling with foamed beads varies depending on the size of the gap that can be formed between adjacent divisional partition members, the size of the gap that can be formed between each of leading ends 60 and inner surface of the cavity mold, or the size of foamed beads to be used, and in relation to them, the insert distance is set at least in a range so that the foamed beads to be firstly filled into the divided molding space may not pass through to the adjacent divided molding space through the gap between the divisional partition member and inner surface of the mold. However, "not pass through" means not passing through completely, and also means to allow certain passing of foamed beads so far as not to have practical effect on the mechanical properties of the obtained molded article.

When the slider 3 is moved to the cavity mold side, so far as not having effects of gravity or the like, the end of the side far from the cavity mold of the insert positioning protrusion 4 is pushed in contact with the slider 3, and the divisional partition member 2a (i) is further inserted into the molding space 13. In this case, the insert distance of the divisional partition member 2a (i) is controlled easily by controlling the moving distance of the slider 3.

Consequently, with the divisional partition member 2 inserted into the molding space 13, each divided molding space is filled with desired foamed beads. When the adjacent divided molding spaces are simultaneously filled with foamed beads, as mentioned above, the gap of the divisional partition member 2 and inner surfaces of the cavity mold, or the gap of adjacent divisional partition members 2 is set within a range not allowing both foamed beads to mutually pass through.

Besides in the case of filling one of the adjacent divided molding spaces first with foamed beads and then the other divided molding space with other foamed beads, the individual gaps may be determined so that the first foamed beads may not pass through the gap of the divisional partition member 2 and the inner surfaces of the cavity mold, or the gap of the adjacent divisional partition members 2, and unless the second foamed beads are small enough to pass through the gap formed between the first foamed beads, they may be small enough to pass through the gap of the divisional partition member 2 and the inner surfaces of the cavity mold, or the gap of the adjacent divisional partition members 2. That is, owing to the presence of the first foamed beads being filled, the second different foamed beads to be filled in the other divided molding space do not substantially mix into the adjacent divided molding space.

After filling all divided molding spaces with foamed beads, steam (saturated steam) is fed into the molding space for molding, and the foamed beads are heated and mutually fusion bonded, and are cooled and departed form the mold. At this time, the divisional partition members 2 may be drawn back to the desired position from the molding space 13 before cooling, and it is more smooth to draw back the divisional partition members 2 when once set back to a desired position from the molding space 13 before start of feed of steam (saturated steam).

In the present invention, the divisional partition members 2 are drawn back from the molding space 13 by moving the slider 3 in the direction of retreating direction B (direction of arrow 31 in FIG. 2 (1)).

At this time, the divisional partition member 2a ($\alpha$) having contact of the slider 3 and retreat positioning protrusion 5 moves out the molding space 13 in the direction of retreating direction B in advance to the divisional partition member 2a ($\beta$) not contacting yet (where $\alpha$ and $\beta$ are mutually different positive integers not more than N). In addition, N means the number of the divisional partition members installed into one of the slider 3. When the slider 3 contacts with the retreat positioning protrusion 5 of the divisional partition member 2a ($\beta$) from this moment, the divisional partition member 2a ($\beta$) begins to move out the molding space 13 in cooperation with the slider 3 in the direction of retreating direction B.

That is, the divisional partition members 2 have such structure that the move of the divisional partition members 2 in the retreating direction B is controlled depending on the layout of the retreat positioning protrusions 5.

The retreat positioning protrusions 5 for defining the retreat position of the divisional partition members 2 are arranged as follows in correspondence to the shape of the molding surface of the cavity mold 12.

First, when inserting the partition member 1, each divisional partition member 2a (i) surpasses the inside (molding surface) of the core mold 11, and moves to the position of filling with the foamed beads, and this distance is supposed to be T(i). The value of i giving the maximum value of T(i) is supposed to be $\gamma$, and the value of i giving the minimum value is $\delta$.

In this case, when the slider 3 moves toward the retreating direction B (direction of arrow 31 in FIG. 2 (1)), the divisional partition member 2a ($\gamma$) begins to move toward the retreating direction B, and successively the divisional partition member 2a (j) (j being a positive integer not more than N, other than $\gamma$ or $\delta$) sequentially moves toward the retreating direction B.

Thus, the divisional partition member 2a ($\delta$) finally starts to move, and the retreat positioning protrusions 5 of each divisional partition member 2a (i) are arranged so that the portions of the divisional partition members 2a (i) may be equal in length from the position of the leading end 60 to the molding surface of the core mold 11. That is, the divisional partition member 2a (i) has a structure of setting the retreat positioning protrusions 5 at the position toward the retreating direction B on the basis of the slider 3, by the value corresponding to Y (i) given in formula 1 shown below. Meanwhile, Y (i) of divisional partition member 2a (γ) is Y (γ). When the position of the retreat positioning protrusions 5 are determined in this manner, all leading ends 60 of the divisional partition members can be drawn back to the metal mold inner surface 56 of the core mold 11, so that the obtained molded article is free from protrusions or holes or suppressed to minimum occurrence.

The divisional partition members 2a (δ), 2a (γ), 2a (j) are not limited to one divisional partition member 2 each. When the partition member is inserted into the molding space, if the divisional partition member 2 surpasses the inside of the core mold 11 and moving up to the filing position of foamed beads, since this moving distance is equal in plural divisional partition members 2, along with the move of the slider 3 in the retreating direction B, plural divisional partition members 2 may simultaneously move in the retreating direction B. Therefore, for example, the divisional partition member 2a (δ) may exist in a plurality as shown in FIG. 3.

The divisional partition member 2 may have a structure of setting the retreat positioning protrusion 5 at position toward the retreating direction B on the basis of the slider 3, by the value corresponding to Y (i) given in formula 2 shown below.

Herein, ε(i) is determined depending on the condition when allowed to have a specified range as for the position of the leading end 60 of each divisional partition member when the divisional partition members 2 retreat.

$$Y(i)=T(\gamma)-T(i)+Y(\gamma) \qquad \text{[Formula 1]}$$

$$Y(i)=T(\gamma)-T(i)+Y(\gamma)+\epsilon(i) \qquad \text{[Formula 2]}$$

where ε(i) is determined as follows depending on the state of retreat of divisional partition member 2a (i).

First, when the divisional partition member 2a (i) retreats, it is as follows.

After the divisional partition member 2a (δ) (the shortest one of lengths from the mold side end of the insert positioning protrusion to the molding surface of the cavity mold) starts to move in the last place, the divisional partition member leading end 60 reaches near the molding surface (inside) of the core mold 11, and retreat of the divisional partition member 2 is complete.

Figure 4:
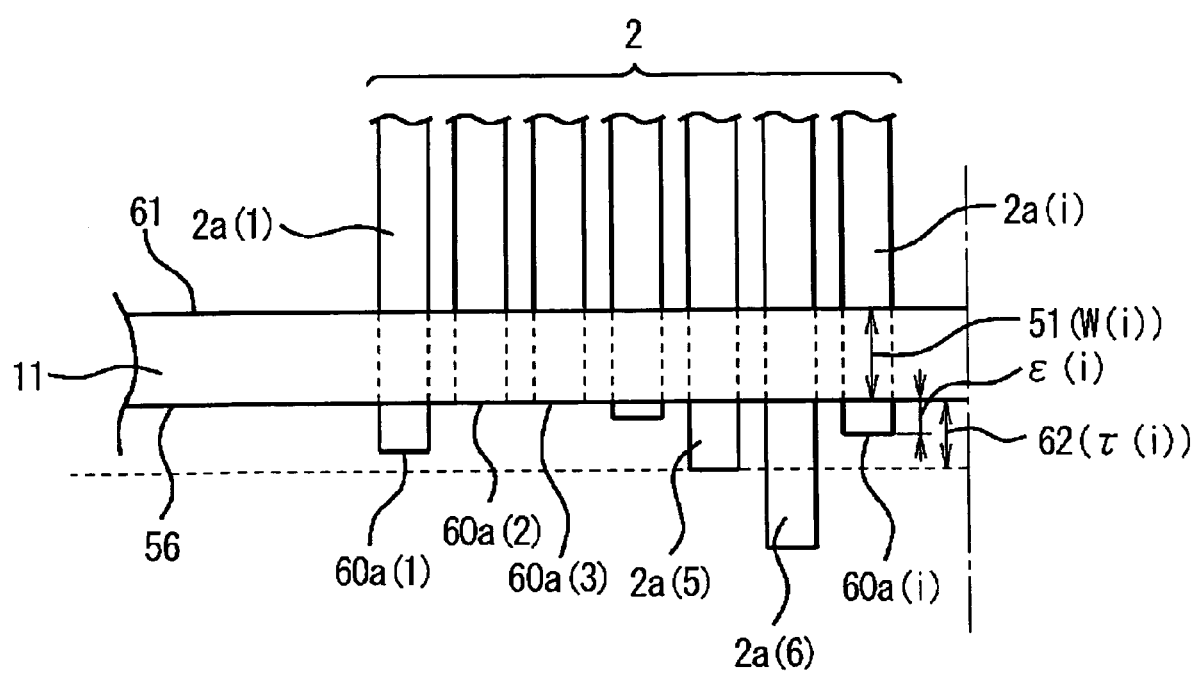
FIG. 4 is a drawing explaining allowable stopping position of leading end of divisional partition member in withdrawal of divisional partition members of the present invention.

Herein, FIG. 4 is a drawing explaining an embodiment of withdrawn state of divisional partition members 2 of the partition member 1.

The divisional partition members 2 of the partition member 1 may be formed as follows in withdrawal. That is, when the partition member 1 is drawn back, the state of the leading end 60a (i) of each divisional partition member 2a (i) (i being a positive integer) may be in a state of being present on the inside metal mold inner surface 56 of the core mold (divisional partition member leading ends 60a (2), 60a (3)).

However, when the partition member 1 retreats, if the leading end 60a (i) of each divisional partition member is out of the metal mold inner surface 56 of the core mold, there is no problem as far as it is within a range allowed by requirement (1) and requirement (2).

Requirement (1): when the partition member 1 retreats, the leading end 60a (i) of each divisional partition member is present in the insertion hole 20 of the core mold. In this requirement, it is necessary that the leading end 60a (i) of each divisional partition member does not retreat over the outer surface 61 of the mold 11. That is, it is necessary that the leading end 60a (i) does not exist within the chamber 16b. If the leading end 60 of the divisional partition member is slightly inside of the insertion hole 20 of the core mold, there is no problem unless large protrusion is formed in the molded article.

Requirement (2): when the partition member 1 retreats, the leading end 60a (i) of each divisional partition member surpasses the metal mold inner surface 56 of the core mold, but does not surpasses the protrusion allowable length 62 (this length being τ (i)) from the metal mold inner surface 56. That is, it is necessary that the leading end 60a (i) present at the position within the protrusion allowable length 62 in the inserting direction. For example, divisional partition member 2a (5) is allowed, but divisional partition member 2a (6) is not allowed.

That is, when the divisional partition member 2 retreats, unless the leading end 60 of the divisional partition member is moved in the inserting direction over τ (i) value, the setting position of the retreat positioning protrusion 5 may be changed somewhat. The value of ε (i) may be in a range satisfying formula (3) considering such allowable change.

$$\tau(i) \geq \epsilon(i) \qquad \text{[Formula 3]}$$

Meanwhile, the object of the above requirement (1) is to prevent foamed beads from entering into the chamber 16b and to prevent forming unnecessary protrusions with the molded article, and hence requirement (1) is not always required to be satisfied as far as the foamed beads do not flow out from the insertion holes 20 or forming of certain protrusions may be allowed.

The value of τ (i) in requirement (2) is determined on the basis of the properties of the molded article. For example, depending on the properties of the molded article, in the case of molded article of which strength is not decreased substantially or is allowed to be lowered to a certain extent, the value of τ (i) may be larger than the value of τ (i) allowed in the molded article not allowing decrease of strength.

Thus, in the in-mold foam molding equipment of the present invention, by changing the fixing positions of the insert positioning protrusions and retreat positioning protrusions, it is easy to adjust the depth of holes or size of protrusions allowed to be formed in the molded article caused by the divisional partition members 2 (including the meaning of eliminating or minimizing occurrence of such holes or protrusions), and hence the equipment is excellent in this respect.

Figure 5:
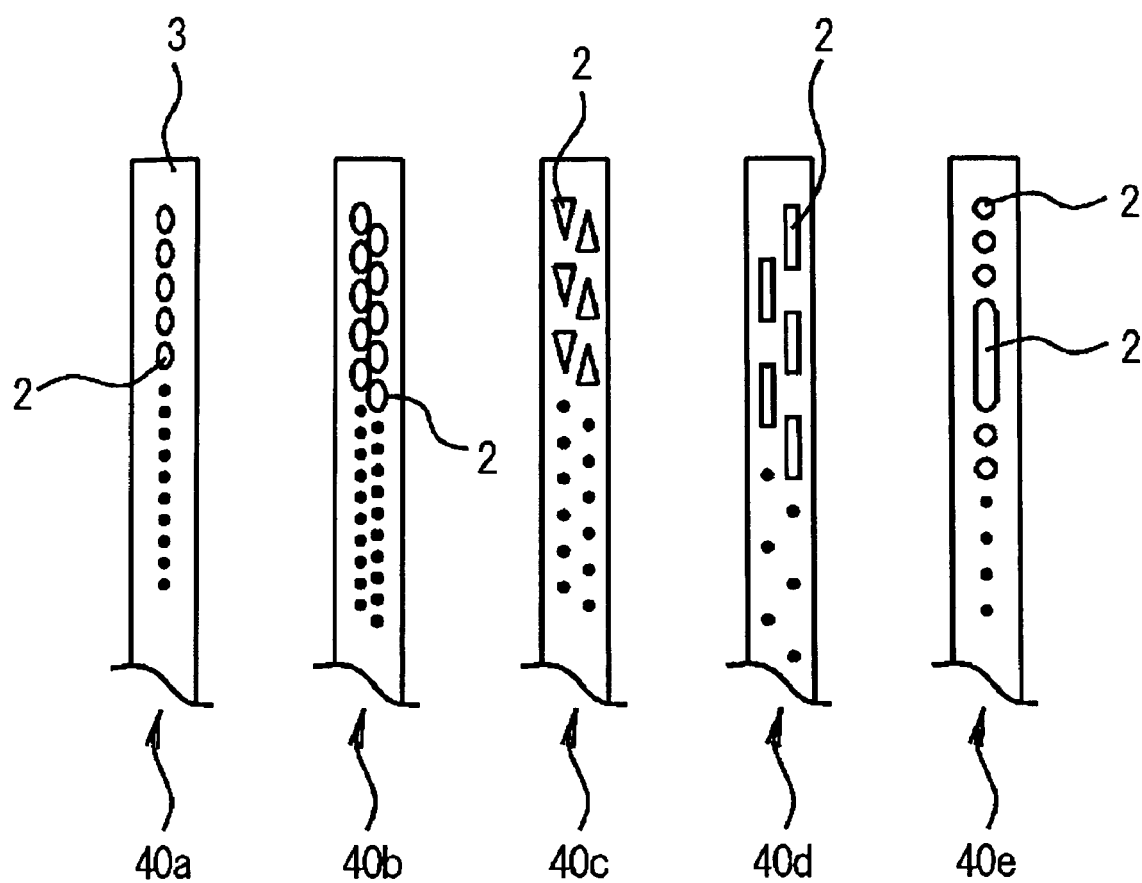
FIG. 5 is a partial diagrammatic view explaining arrangement state and sectional shape in orthogonal direction with respect to inserting and retreating direction of divisional partition members of the present invention.

FIG. 5 is a partial diagrammatic view explaining arrangement state and sectional shape in orthogonal direction with respect to inserting and retreating direction of divisional partition members 2 in an embodiment of the present invention.

In the partition member 1, the divisional partition members 2 are arranged in various configurations as shown in FIG. 5, including, for example, a partition member layout 40a having circular columnar divisional partition members 2 arranged in a linear configuration, a partition member layout 40b having divisional partition members 2 arranged alternately not forming rows linearly, a partition member layout 40c having triangular columnar divisional partition members 2 arranged alternately not forming rows linearly, a partition member layout 40d having rectangular parallelepiped divisional partition members 2 arranged alternately by overlapping partly, and a partition member layout 40e having divisional partition members 2 combining members partly different in width, not having equal width. The layout and shape of divisional partition members 2 are not limited, but may include elliptical or polygonal sectional shapes, and others.

When inserting the divisional partition members 2, when the distance of moving the divisional partition members 2 from the inside molding surface of the core mold 11 to the inside molding surface of the cavity mold 12 is a constant value in a specific region, as shown in the partition member layout 40e in FIG. 5, in such region, the divisional partition members 2 may not be divided in the same width as in other regions, and the members may be partly different in width in such region. In addition, finely divided divisional partition members are desired to be used to the portions which angle formed by contacting the tangent of the molding surface with inserting and retreating direction of the divisional partition member 2 has acute angle.

FIG. 6 is a partial sectional view of part of the vertical direction section of molding equipment, showing a divided state of molding space by the partition member of the present invention. In the case, the in-mold foam molding equipment 10 has a structure of forming divided molding spaces 13a, 13b, 13c and 13d. Foamed beads filling device 14 of the in-mold foam molding equipment 10 is installed so as to communicate with each divided spaces.

Sign 8 indicated in FIG. 6 is the plate installed on the inner molding surface of the core mold, located around each partition members 1A, 1B and 1C. When the plate is installed into this location, even if there is a big gap between the insertion hole and the divisional partition member in some degree, occurrence of burr, as large as protruded to the outside of inner molding surface of the core mold can be prevented in the boundary of neighboring portions of the molded article. By the way, because the void corresponding to the shape of plate is formed to the boundary of between portions of the molded article, it is preferable that the plate is small as much as possible. Besides, in the present invention, by making the gap between the insertion hole and the divisional partition member small enough, it is omissible to use such a plate.

A slider 3 is connected to moving distance adjusting means 52 for driving the slider. The moving distance adjusting means 52 comprises an air cylinder 50, and is designed to adjust the move of the slider 3. However, by the motion of the air cylinder 50, the molding space 13 is actually divided by the divisional partition members 2a (i). Hence, in the in-mold foam molding equipment 10, if the moving distance adjusting means 52 is directly connected to each one of the divisional partition members 2a (i), the action and effect of the present invention are satisfied. For example, the air cylinder 50 may be individually installed in the divisional partition members 2a (i). In such a case, the slider 3 may not be required.

However, considering the cost and ease of control, the in-mold foam molding equipment 10 is preferred to have a structure which at least two or more divisional partition members 2 can adjust the moving distance by one slider 3, further, to have a structure which all the divisional partition members 2 consists of one partition member 1 for dividing neighboring molding space can adjust the moving distance by one slider 3.

Figure 8:
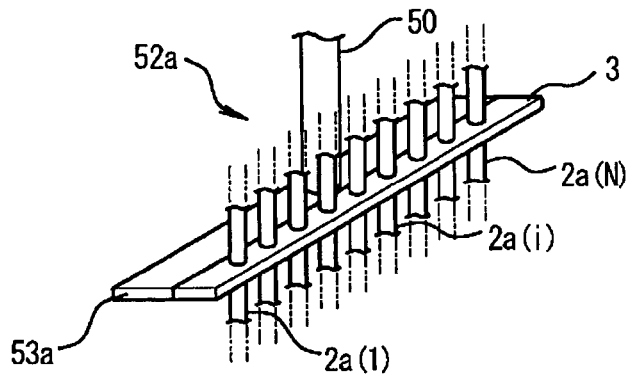
FIG. 8 (1), (2), and (3) are partial perspective views explaining an embodiment of move control means provided in the partition member used in the in-mold molding equipment of the present invention.
Figure 8:
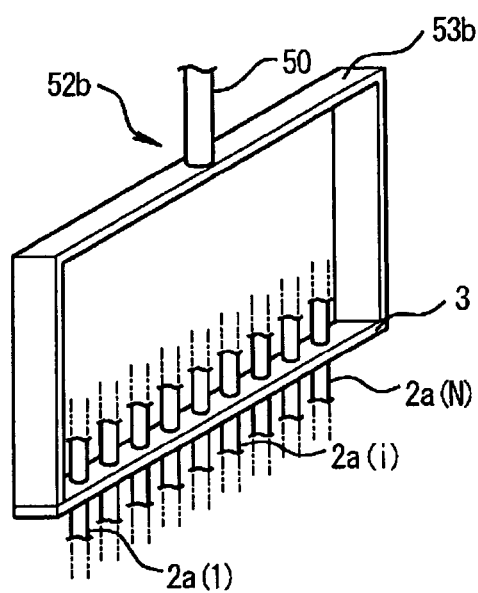
Figure 8:
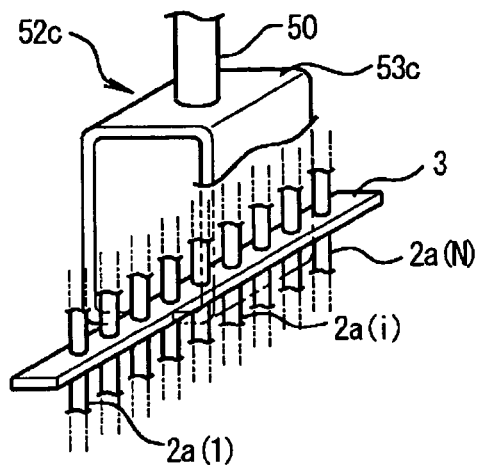

FIG. 8 shows partial perspective views explaining an embodiment of moving distance adjusting means 52 of the slider 3. The moving distance adjusting means 52 may have a structure of connecting the slider 3 to the air cylinder 50 by way of a connection member 53a having a structure connected to its one end (moving distance adjusting means 52a in FIG. 8 (1)). The moving distance adjusting means 52 may also have a structure of connecting the slider 3 to the air cylinder 50 by way of a connection member 53b having a structure connected to its both ends (moving distance adjusting means 52b in FIG. 8 (2)), or may have a structure of connecting the slider 3 to the air cylinder 50 by way of a connection member 53c connected to the both ends of the slider 3 parallel to its longitudinal direction (moving distance adjusting means 52c in FIG. 8 (3)).

Further, it is preferable that the slider 3 is disposed in the chamber 16b, so that multiple deep holes are not required in the housing 15, and the entire equipment can be formed in a compact design. FIG. 2 (2) is a drawing explaining an embodiment of the in-mold foam molding equipment 10 in such a case. At this time, the in-mold foam molding equipment 10 has the slider 3 disposed in the chamber 16b. The air cylinder 50 is disposed slidably or movably while keeping airtight the insertion holes 23 of the housing 15.

Considering the balance of operation of the slider 3, the moving distance adjusting means 52 may have two or more air cylinders 50 per one slider 3. Incidentally, as far as the moving distance can be adjusted, the moving distance adjusting means of the moving distance adjusting means 52 is not limited to the air cylinder alone.

In the in-mold molding equipment 10 shown in FIG. 2 (1), (2), the mold for inserting the divisional partition members 2 is the core mold, and it has a flat shape, while the cavity mold is shown to have a special shape, but in the present invention, the core mold may have a curved shape, or the shape of the slider 3 is not limited to a flat plate, but may be a curved shape. This is because the move of the divisional partition members 2 can be controlled by the position of installation of the insert positioning protrusions 4 and retreat positioning protrusions 5.

If the molding surface shapes of the section of the core mold and cavity mold are not identical, and the shape of the mold of the side of inserting the partition member has a stepped shape, the divisional partition member 2 may be inserted in every stepped shape.

The partition member 1 is not limited in the linear shape of the shape of the section in the inserting direction, but may include closed shape, U-shape, L-shape, and the like.

The partition member 1 may be inserted in the cavity mold direction from the core mold, or may be inserted in the core mold direction from the cavity mold. Moreover, the partition member 1 may be cut off in part, and a part may be inserted in the core mold from the cavity mold, and other may be inserted in the cavity mold from the core mold.

Materials for foamed beads may be properly selected depending on the use conditions of the molded product, and it is preferred to use materials easy to manufacture the foamed molded article in consideration of the apparent density as described below.

The expansion ratio of foamed beads (the density of resin material of foamed beads divided by the apparent density of foamed beads) varies depending on the material of the foamed beads. Usually, a preferred range is about 3 times to 150 times. Specifically, in foamed beads made of polystyrene based synthetic resin material, it is preferred to use foamed beads in an expansion ratio range of 3 times to 100 times, more preferably in an expansion ratio range of 3 times to 80 times. Or, in foamed beads made of polyolefin based synthetic resin material, it is preferred to use foamed beads in an expansion ratio range of 3 times to 90 times, more preferably in an expansion ratio range of 3 times to 60 times.

Particle size of foamed beads is preferably 1 mm to 10 mm, or more preferably 2 mm to 8 mm.

Base resins for foamed beads include, for example, the following polyolefin based resins and polystyrene based resins.

Examples of polyolefin based resin include polypropylene homopolymer, propylene-ethylene random copolymer, propylene-ethylene block copolymer, propylene-butene random copolymer, propylene-ethylene-butene random copolymer, other propylene based resins with propylene unit component of 50 mole % or more, modified polypropylene with propylene unit component of 50 mole % or more impregnating and polymerizing monomer such as styrene monomer or acrylic based monomer, high density polyethylene, straight-chain low density polyethylene copolymerizing ethylene and a small amount (20 mole % or less) of α-olefin, ethylene vinyl acetate copolymer, and other polyethylene based resin with ethylene unit component of 50 mole % or more. Examples of polystyrene based resin include styrene-butadiene copolymer, styrene-butadiene-acrylonitrile copolymer, styrene-acrylic acid copolymer, styrene-methacrylic acid copolymer, styrene-maleic anhydride copolymer, and other polystyrene based resins with styrene unit component of 50 mole % or more.

Other examples are polyethylene terephthalate resin, polybutylene terephthalate resin, polyethylene naphthalate resin, other thermoplastic aromatic polyester resin, aromatic polycarbonate resin, polyphenylene ether resin, and polyurethane resin. Other examples are mixture of two or more resins or copolymers selected from the above resins or copolymers, and mixture mainly composed of any one of the above resins, copolymers, and mixture (containing 50 wt. % or more), and elastomer.

As the material for the bumper core material, polyolefin based resin is effective. It is because the polyolefin based resin is excellent in chemical resistance and processing properties. In particular, a polypropylene based resin with Vicat softening point (JIS K 6758) of 125° C. or more, preferably 130° C. or more, or a resin containing propylene component by 50% or more is excellent in heat resistance, impact absorption in bumper core material processing, and lightness of weight.

Average cell size of foamed beads of polyolefin based resin material is not particularly specified, but is generally in a range of 5 μm to 900 μm. Average cell size of foamed beads is more preferably 10 μm to 700 μm, and further preferably 50 μm to 550 μm.

Polyolefin based resin may be also mixed with rubber component such as ethylene-propylene copolymer rubber.

Foamed beads having different characteristics to be filled in the divided spaces maybe selected from foamed beads different in expansion ratio in desired divided spaces depending on the molded article, and different foamed beads in consideration of the bulk density of foamed beads, average cell size, foamed beads size, material, color, elasticity, aroma and other characteristics may be also selected.

Embodiment

Figure 7:
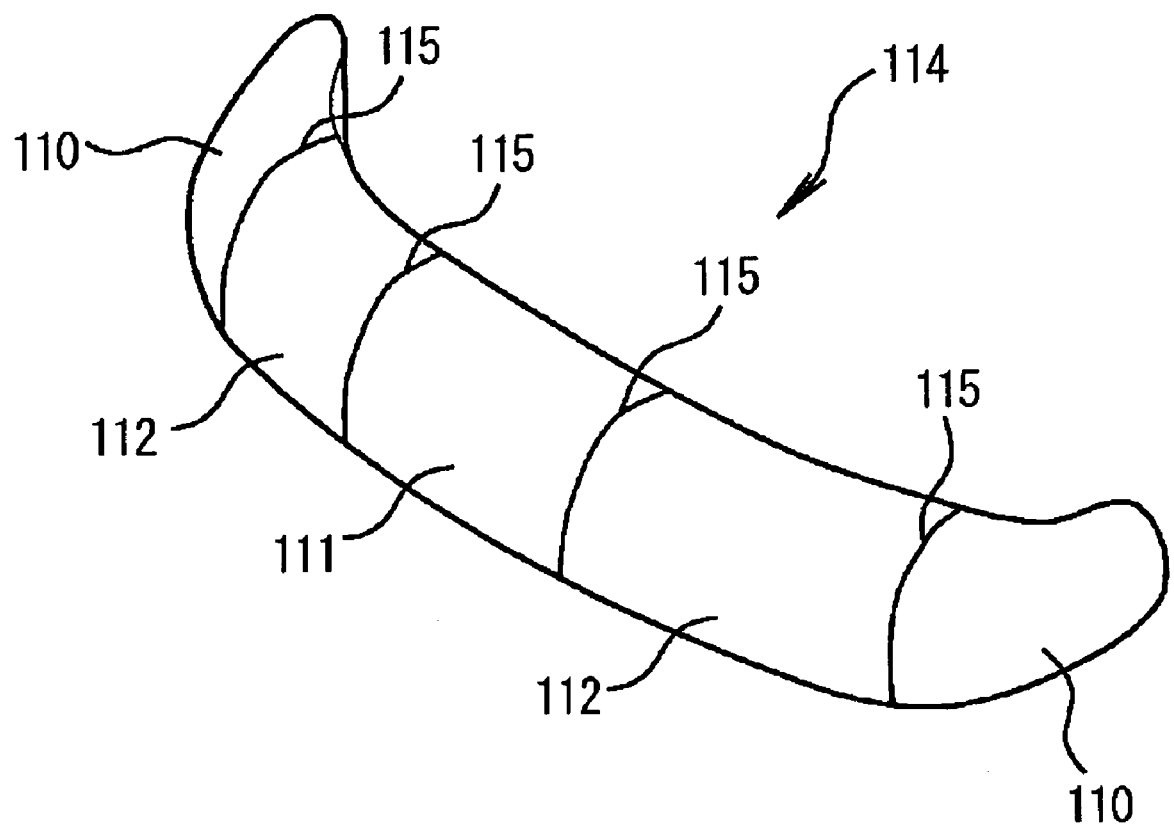
FIG. 7 is a drawing explaining an example of automobile bumper core material formed by using the in-mold molding equipment of the present invention.

Concerning a molded article manufactured by the in-mold molding equipment of the present invention, molding of an automobile bumper core material is explained as an embodiment of in-mold molded piece while referring to FIG. 7.

A bumper core material 114 comprises side impact energy absorbers 110 having both ends slightly curved backward, a central impact energy absorber 111, and middle impact energy absorbers 112 formed between the side impact energy absorbers 110 and central impact energy absorber 111.

The bumper core material 114 of this embodiment is designed to absorb high energy of impact by the high density foam molded portions of the side impact energy absorbers 110 and central impact energy absorber 111, and to lower the energy absorption of impact by the middle impact energy absorbers 112 as lower density foam molded portions than the side impact energy absorbers 110 and central impact energy absorber 111, thereby reducing the weight of the structure on the whole. Distribution of high density and low density of the bumper core material 114 may be arbitrarily determined in consideration of the size and shape of the bumper core material, shape, desired energy absorbing property, and others. Depending on the case, relatively low density foam molded portions compared with other parts may be integrally formed in the upper parts and/or lower parts of the bumper core material. In this case, these parts are formed as form retaining parts to avoid concave fascia, not intended to absorb impact energy.

For example, if propylene resin is used as base resin of the bumper core material 114, the middle impact energy absorbers 112 are relatively low in density of apparent density of foam molded portion of 0.02 g/cm$^3$ to 0.15 g/cm$^3$, while the side impact energy absorbers 110 and central impact energy absorber 111 are relatively high in density of apparent density of foam molded portion of 0.03 g/cm$^3$ to 0.45 g/cm$^3$. The density difference between high density foam molded portion and low density foam molded portion is preferred to be about 0.08 g/cm$^3$ to 0.43 g/cm$^3$.

Using such synthetic resin foamed beads, the bumper core material 114 can be manufactured as follows by the in-mold molding equipment.

The molding space 13 of the in-mold molding equipment is divided by the partition member 1 in the positions corresponding to the boundary 115 for forming side impact energy absorber 110, middle impact energy absorber 112, central impact energy absorber 111, middle impact energy absorber 112, and side impact energy absorber 110.

That is, on the in-mold molding equipment 10, the molding space is divided into the divided spaces by inserting four partition members 1 that each is composed of divisional partition members corresponding to the positions of the boundary 115 from outside of the metal mold, into the molding space formed by the core mold and cavity mold. In the divided spaces, specified foamed beads are filled into specified divided spaces from the filling devices 14, and after filling, the partition members 1 are drawn back. Then, from the feed port 18, steam is fed into the molding space through the chambers 16a, 16b, and ventilation holes 17, and the foamed beads are heated and mutually fusion bonded, and cooling water is supplied from the feed port 18 to cool, and a desired bumper molded article is manufactured.

In the present invention, the material of the divisional partition members 2 is not particularly specified as far as resistant enough to withstand the filling pressure of the foamed beads and the heat of molding. Therefore the divisional partition members 2 may be made of metal material, synthetic resin material, ceramics or other desired materials. Elastic deforming metal materials and synthetic resins may be also used. Thickness of the divisional partition members 2 is preferred to be about 0.5 mm to 10.0 mm.

The interval of adjacent divisional partition members may be determined so that at least one type of foamed beads may not pass through. Therefore, this interval may be nearly zero.

The in-mold molding equipment of the present invention is not limited to the automobile bumper core material, but includes buffer material for human body protection, protector, bed buffer material, and other various foam molded articles.

The in-mold molding equipment of the present invention is capable of suppressing occurrence of holes and defects on the boundary of molded parts or portions having different characteristics and occurrence of large protrusions, when manufacturing one molded article composed of two or more molded parts or portions having different characteristics.

The in-mold molding equipment of the present invention comprises a movable partition member moving in and out being composed of a plurality of divisional partition members, each divisional partition member has the protrusions for defining the moving distance corresponding to the shape of the molding surface of the mold, and two or more divisional partition members are designed to control the moving distance in batch by means of a slider, so that the divisional partition members can be installed at desired positions without requiring moving distance adjusting means individually for the divisional partition members.

Obviously, numerous modifications and variations of the present invention are possible in light of the above teachings. It is therefore to be understood that, within the scope of the appended claims, the invention may be practiced otherwise than as specifically described here.

What is claimed is:

1. An in-mold foam molding equipment, comprising:
    at least a movable partition member free to move in and out for dividing a molding space formed by a pair of molds into divided spaces,
    wherein the partition member is composed of a plurality of divisional partition members independently separated,
    wherein each of the plurality of divisional partition members individually has a retreat positioning protrusion and an insert positioning protrusion, and the plurality of divisional partition members are installed in a slider for moving the plurality of divisional partition members by contacting with the retreat positioning protrusions or the insert positioning protrusions,
    wherein the slider is configured to move between the retreat positioning protrusions and the insert positioning protrusions, and the plurality of divisional partition members are configured to be movable in cooperation with the motion of the slider by contacting with the retreat positioning protrusions or the insert positioning protrusions, so that the plurality of divisional partition members divide the molding space corresponding to the shape of a desired molded article into divided spaces.

2. The in-mold foam molding equipment as claimed in claim 1, wherein the retreat positioning protrusion is installed at a position where the leading end of each of the plurality of the divisional partition members is present within a specific range from the inside molding surface of one mold in the state of the plurality of divisional partition members drawn back from the inside molding surface of the other mold, and the insert positioning protrusion is installed at a position where the leading end of each of the plurality of divisional partition members contacts with the inside molding surface of the other mold or is present with a specific range from the inside molding surface of the other mold in the state of the plurality of divisional partition members inserted into the molding space.

3. The in-mold foam molding equipment as claimed in claim 1, further comprising
    a housing, the slider provided inside of the housing, and
    a drive device for operating the slider.

4. The in-mold foam molding equipment as claimed in claim 2, further comprising
    a housing, the slider provided inside of the housing, and
    a drive device for operating the slider.

5. The in-mold foam molding equipment as claimed in claim 1, further comprising
    a housing, the slider provided outside of the housing, and
    a drive device for operating the slider.

6. The in-mold foam molding equipment as claimed in claim 2, further comprising
    a housing, the slider provided outside of the housing, and
    a drive device for operating the slider.

7. The in-mold foam molding equipment as claimed in claim 1, wherein a pair of molds is composed of a core mold and a cavity mold, and the plurality of divisional partition members are installed in the slider enabled to be inserted into the molding space from the core mold side.

8. The in-mold foam molding equipment as claimed in claim 2, wherein a pair of molds is composed of a core mold and a cavity mold, and the plurality of divisional partition members are installed in the slider enabled to be inserted into the molding space from the core mold side.

9. The in-mold foam molding equipment as claimed in claim 1, wherein a pair of molds is composed of a core mold and a cavity mold, and the plurality of divisional partition members are installed in the slider enabled to be inserted into the molding space from the cavity mold side.

10. The in-mold foam molding equipment as claimed in claim 2, wherein a pair of molds is composed of a core mold and a cavity mold, and the plurality of divisional partition members are installed in the slider enabled to be inserted into the molding space from the cavity mold side.

* * * * *